US012790017B2

(12) United States Patent
Gaikwad et al.

(10) Patent No.: US 12,790,017 B2
(45) Date of Patent: Nov. 10, 2026

(54) NON-CONTACT AIRCRAFT FUEL TANK GAUGING SYSTEM AND METHOD

(71) Applicant: Eaton Intelligent Power Limited, Dublin (IE)

(72) Inventors: Sandip Balasaheb Gaikwad, Pune (IN); Ranjit Dinkar Patil, Kolahapur (IN); Michael Olsztyn, Costa Mesa, CA (US); Graham Peter Baker, Issaquah, WA (US)

(73) Assignee: Eaton Intelligent Power Limited, Dublin (IE)

( * ) Notice: Subject to any disclaimer, the term of this patent is extended or adjusted under 35 U.S.C. 154(b) by 580 days.

(21) Appl. No.: 18/184,828

(22) Filed: Mar. 16, 2023

(65) Prior Publication Data

US 2023/0294838 A1 Sep. 21, 2023

(30) Foreign Application Priority Data

Mar. 18, 2022 (IN) ............................ 202211014955

(51) Int. Cl.
*B64D 37/00* (2006.01)
*B64D 37/30* (2006.01)
(Continued)

(52) U.S. Cl.
CPC ........... *B64D 37/005* (2013.01); *B64D 37/30* (2013.01); *G01F 23/14* (2013.01); *G01F 23/18* (2013.01);
(Continued)

(58) Field of Classification Search
CPC ........ G01F 23/804; G01F 23/14; G01F 23/18; G01F 23/22; G01F 23/26; G01F 23/292;
(Continued)

(56) References Cited

U.S. PATENT DOCUMENTS 2,240,988 A * 5/1941 Hertel ................ G01F 23/2925 359/638
4,322,979 A * 4/1982 Fromm ................ G01L 9/0077 359/833
(Continued)

FOREIGN PATENT DOCUMENTS

EP 3 318 849 A1 5/2018
EP 3 044 551 B1 3/2020
(Continued)

OTHER PUBLICATIONS

Extended European Search Report for EP Patent Appln. No. 23162518.7, dated Jul. 17, 2023 (9 pages).
(Continued)

*Primary Examiner* — Catherine T. Rastovski
*Assistant Examiner* — Carter W Ferrell
(74) *Attorney, Agent, or Firm* — Merchant & Gould P.C.

(57) ABSTRACT

A measurement system and method for liquid quantity in a receptable, the measurement system including a plurality of sensor units at various locations of the receptacle, the receptable including the liquid therein, each of the plurality of sensor units being on an outside surface of the receptacle, a data receiver coupled to the plurality of sensor units via one or more connectors and configured to receive measurements from the plurality of sensor units via the one or more connectors, and a processor coupled to the data receiver and configured to convert the received measurements from the plurality of sensor units to a measured quantity of liquid inside the receptable.

19 Claims, 13 Drawing Sheets

(51) Int. Cl.
*G01F 23/14* (2006.01)
*G01F 23/18* (2006.01)
*G01F 23/80* (2022.01)
*G01F 23/292* (2006.01)

(52) U.S. Cl.
CPC ........ *G01F 23/804* (2022.01); *G01F 23/2924* (2013.01)

(58) Field of Classification Search
CPC .... G01F 23/2924; G01F 22/00; G01F 23/246; G01F 23/2927; G01F 23/2928; G01F 25/20; G01F 23/2922; B64D 37/30; B64D 37/04; B64D 37/02; G01L 9/0077; G01L 9/02091; A61B 2562/0233; A61B 2562/0247; B60K 2015/03217; B60K 15/03519; B60K 2015/0319; B60K 15/03; B60K 2015/03302
See application file for complete search history.

(56) References Cited

U.S. PATENT DOCUMENTS

| | | | | |
|---|---|---|---|---|
| 5,399,876 | A * | 3/1995 | LaClair | G02B 6/04 250/577 |
| 7,024,317 | B1 * | 4/2006 | George | G01F 23/804 702/50 |
| 7,710,567 | B1 | 5/2010 | Mentzer et al. | |
| 10,222,251 | B2 | 3/2019 | Kopansky et al. | |
| 10,620,032 | B2 | 4/2020 | Kopansky et al. | |
| 10,627,280 | B2 | 4/2020 | Zakrzewski et al. | |
| 10,627,281 | B2 | 4/2020 | Kopansky et al. | |
| 11,137,278 | B2 | 10/2021 | Kopansky et al. | |
| 11,300,438 | B2 | 4/2022 | Kopansky et al. | |
| 11,680,840 | B2 | 6/2023 | Kopansky et al. | |
| 11,781,896 | B2 | 10/2023 | Kopansky et al. | |
| 2005/0114070 | A1 * | 5/2005 | Dozoretz | G01L 13/00 702/140 |
| 2006/0266111 | A1 * | 11/2006 | Gourlay | G01F 23/18 73/299 |
| 2009/0222230 | A1 * | 9/2009 | Bauerle | G01L 27/007 702/98 |
| 2011/0011472 | A1 * | 1/2011 | Mc Lain | F02M 25/0809 137/624.12 |
| 2014/0053645 | A1 * | 2/2014 | Ward | G01F 23/14 73/302 |
| 2014/0094697 | A1 * | 4/2014 | Petroff | A61B 1/015 600/427 |
| 2015/0100253 | A1 * | 4/2015 | Austerlitz | G01F 22/00 702/55 |
| 2015/0204709 | A1 | 7/2015 | Dudley et al. | |
| 2018/0164140 | A1 * | 6/2018 | Carralero | G01L 9/0079 |
| 2018/0172536 | A1 * | 6/2018 | Adams | G01L 9/0076 |
| 2018/0216983 | A1 | 8/2018 | Benjey | |
| 2019/0376830 | A1 | 12/2019 | Park et al. | |
| 2021/0239508 | A1 | 8/2021 | Kopansky et al. | |
| 2022/0003590 | A1 | 1/2022 | Kopansky et al. | |
| 2023/0137856 | A1 * | 5/2023 | Vincente Oliveros | G01F 23/292 73/291 |
| 2024/0353250 | A1 * | 10/2024 | Moutaux | F01M 11/12 |

FOREIGN PATENT DOCUMENTS

| | | | |
|---|---|---|---|
| EP | 3 760 985 | A1 | 1/2021 |
| EP | 3 859 288 | A1 | 8/2021 |
| FR | 2 596 150 | A1 | 9/1987 |
| WO | 2015/038514 | A1 | 3/2015 |
| WO | 2020060575 | A1 | 3/2020 |

OTHER PUBLICATIONS

European Office Action issued in the corresponding European Patent Application No. 23 162 518.7, dated Sep. 2, 2025.

* cited by examiner

FIG. 5A
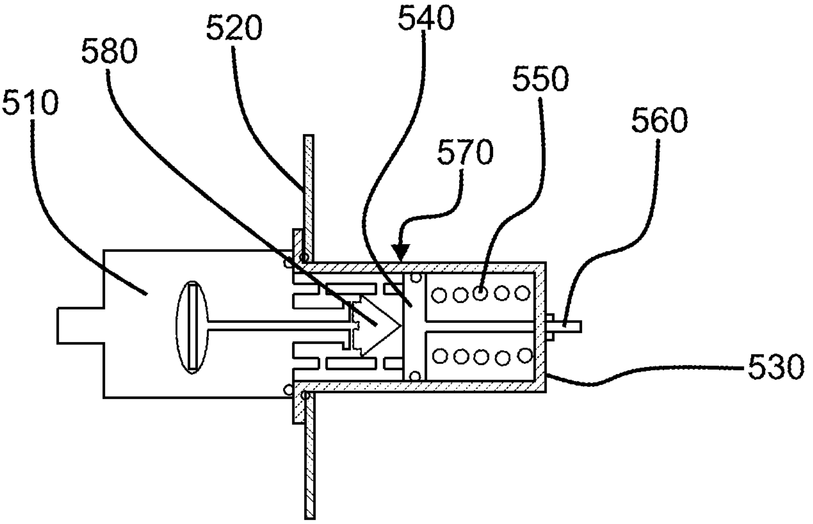
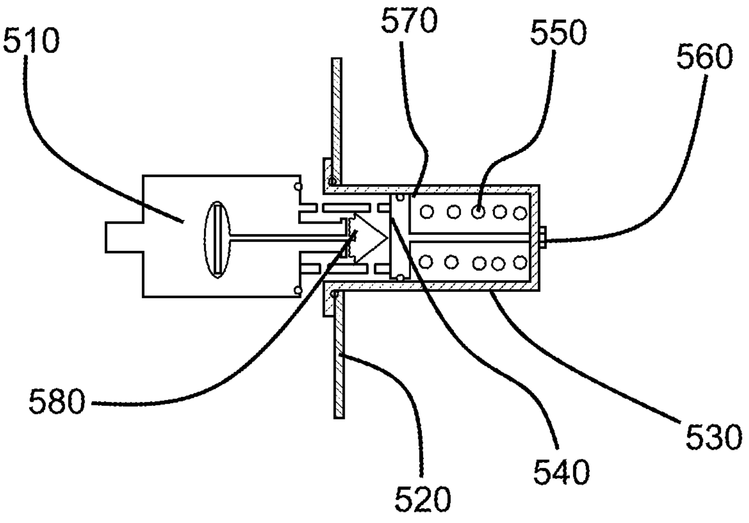
FIG. 5B

NON-CONTACT AIRCRAFT FUEL TANK GAUGING SYSTEM AND METHOD

PRIORITY INFORMATION

This application claims priority from Indian Application No. 202211014955, titled "Non-Contact Aircraft Fuel Tank Gauging System and Method," and filed Mar. 18, 2022, the contents of which are incorporated herein by reference in their entirety.

TECHNICAL FIELD

The present disclosure relates generally to fuel gauges located outside of aircraft fuel tanks, the gauges being able to determine accurate levels of the fuel tanks and fuel levels inside the fuel tanks.

BACKGROUND

In an aircraft, fuel is stored in fuel tanks located within the wings, fuselage and/or tail section. Additionally or alternatively, liquid hydrogen tanks may also be located within the fuselage. Accurately determining fuel levels within these fuel tanks is advantageous because accuracy allows the aircraft operators to carry less excess fuel, and thus operate aircrafts more efficiently and cost effectively. Accurate fuel gauging may be challenging due to factors such as, e.g., variability of fuel characteristics such as density, complex fuel tank geometry, tank orientation, and the like, during in-flight maneuvers.

Fuel-gauging systems typically utilize capacitive probes that are disposed throughout the inside of a fuel tank to measure, e.g., fuel level, fuel quantity and fuel volume remaining in the fuel tank. Such systems may require a large number of fuel probes, as well as the mounting hardware and wiring for each fuel sensor, in order to obtain accurate measurements of, e.g., fuel level, fuel quantity and fuel volume remaining in the fuel tank. Alternatively, pressure-based systems may measure a hydrostatic pressure differential within the fuel tank in order to estimate the quantity of fuel remaining inside the fuel tank. Such systems may also additionally rely on, e.g., acceleration measurements from one or more independent accelerometers. Pressure-based systems generally require fewer sensors than capacitive-based systems, but may also be more sensitive to the impact of wing distortion on the fuel tank, sensitive to tank pressure variations during transient operations.

SUMMARY

In one aspect, the technology relates to a measurement system for liquid quantity in a receptable, the measurement system including a plurality of sensor units at various locations of the receptacle, the receptable including the liquid therein, each of the plurality of sensor units being on an outside surface of the receptacle, a data receiver coupled to the plurality of sensor units via one or more connectors and configured to receive measurements from the plurality of sensor units via the one or more connectors, and a processor coupled to the data receiver and configured to convert the received measurements from the plurality of sensor units to a measured quantity of liquid inside the receptable.

In an example of the above aspect, the liquid includes aircraft fuel, and the receptable comprises a fuel tank, and in another example the liquid includes liquid hydrogen, and the receptable is a liquid hydrogen storage tank. In an example, the receptacle further includes a surge tank configured to absorb a surge of pressure in the fuel tank. In another example, the plurality of sensor units are configured to measure, at a physical location thereof, a pressure inside the receptable. As another example, the plurality of sensor units includes at least one of an optical differential pressure sensor and an optical absolute pressure sensor.

In another example of the above aspect, the plurality of sensor units comprises optical integrated sensor units, each integrated sensor unit including a temperature sensor configured to measure a temperature at the physical location thereof, an absolute sensor configured to measure an absolute pressure at the physical location thereof, a differential sensor configured to measure a differential pressure at the physical location thereof, and an optical prism sensor inside the receptable at the location thereof. In another example, the optical prism pressure sensor includes an optical prism at an end thereof, and in an installed configuration, the optical prism is inside the receptable. Also, the optical prism is configured to generate an optical light path therein, and when the optical prism is in contact with liquid inside the receptable, the optical light path is disturbed by the liquid.

In other examples of the above aspect, the pressure measurement system further includes one or more flowmeters, each flowmeter being configured to measure an amount of liquid transferred in and out of the receptacle. For example, at least one of the flowmeters is coupled to a feed line to measure the amount of liquid transferred in the receptable, and at least another one of the flowmeters is coupled to a transfer line to measure the amount of liquid transferred out of the receptacle.

In another aspect, the technology relates to a method of liquid measurement inside of a receptable, the method including measuring a plurality of pressure measurements at a plurality of locations of the receptacle, cross-checking the plurality of pressure measurements, receiving a pressure measurement of each of the cross-checked plurality of pressure measurements, and converting the received pressure measurements into a quantity of liquid remaining in the receptacle. For example, wherein cross-checking the plurality of pressure measurements includes comparing the pressure measurement at one location with the pressure measurements at other locations in a vicinity of the one location, and based on the comparison, determining whether the pressure measurement at the one location is a valid pressure measurement. In an example, converting the received pressure measurements includes receiving the valid pressure measurements. In another example, determining whether the pressure measurement at the one location is a valid pressure measurement comprises determining that a difference between the pressure measurement at the one location and the pressure measurements at other locations in a vicinity of the one location is below a desired threshold.

BRIEF DESCRIPTION OF THE DRAWINGS

The accompanying drawings, which are incorporated in and constitute a part of the description, illustrate several principles of the present disclosure. A brief description of the drawings is as follows:

FIGS. 5A-5B are schematic diagrams illustrating an optical pressure sensor, in both an installed and a removed configuration, in accordance with principles of the present disclosure.

DETAILED DESCRIPTION

Figure 1:
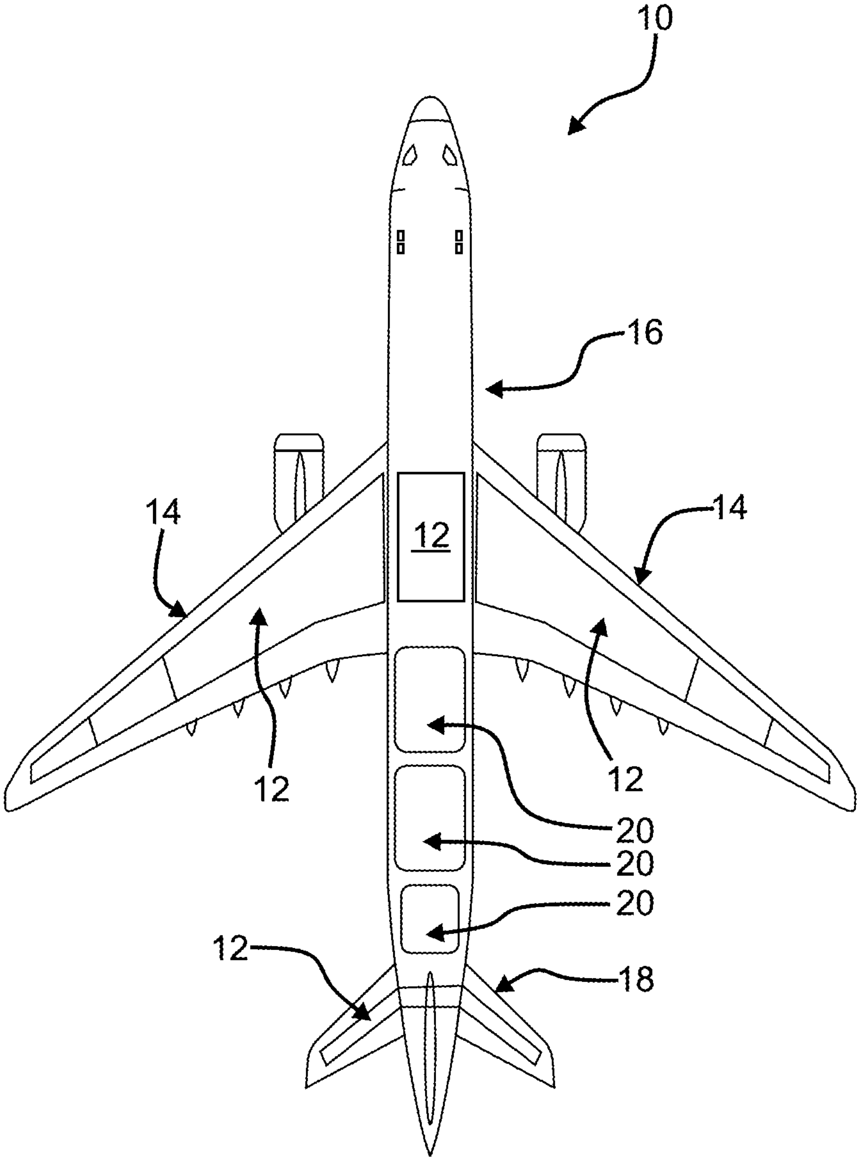
FIG. 1 is a simplified illustration of fuel tanks on an aircraft.

Current aircraft fuel systems typically use capacitance-based fuel measurement systems, and these systems typically need gauging sensors and associated wiring harnesses to be installed within the inside cavity of the fuel tanks. Such designs may add cost and weight to the system. For example, sensors that are installed inside the cavity of the fuel tanks typically necessitate longer build times, higher maintenance costs, and longer down times for repair and maintenance. Accordingly, non-contact fuel gauges that do not have sensors and associated wirings installed within the inside cavity of the fuel tanks may be advantageous.

Recent development and improvement in optical pressure sensor technology allows for design of fuel measurement systems with no in-tank installation and with reduced system weight, improved accuracy, reduced build times, and lower build, installation and maintenance costs. For example, aircraft fuel measurement system designs utilizing optical pressure sensors may help achieve requirements of measurement accuracy and system redundancy for aircraft certification while avoiding the additional costs of in-tank fuel sensors.

Accordingly, in-tank fuel sensors and associated wiring present technical problems of higher costs, higher down times, and higher safety concerns due to the fact that gauging sensors and associated wiring harnesses are installed within the fuel tanks. A solution to these technical problems may include using non-contact optical pressure sensor designs that meet the required intrinsic safety requirements of fuel measurement systems, and that provide the required design redundancies. Non-contact optical pressure sensor gauging systems may be located entirely, or substantially, outside of a fuel tank system. Non-contact optical pressure sensor gauging systems may also avoid requiring entry into the fuel tank for installation and maintenance, which may save time and avoid down time of the aircraft. Such systems may include optical pressure sensors that measure absolute pressure, as well as differential pressure sensors and optical cables.

Optical differential pressure sensors measure a differential pressure of the fuel tank with respect to tank ullage pressure, and allows to achieve a given accuracy in the measure of the fuel remaining in the fuel tank, e.g., 0.5% gauging accuracy at full on ground. For example, a differential pressure sensor with a measurement range of approximately 4 psig (10 ft tank level) and with, e.g., 0.2% error on Full Scale (FS) may have an error of 0.008 psig, or 0.27" error on full fuel height, which equates to 0.32% error at full on large commercial aircraft tanks. The above values of error percentage and pressure are examples only, and other pressures and percentages may be applicable, according to various examples of the disclosure. Differential pressure measurements may require complex arrangements and tubing to connect the sensor to the ullage space, and the differential pressure system may be bulky and may not allow for weight savings. Also, the ullage measurement port may become submerged in fuel during maneuvering attitudes, therefore driving additional sensor count, and mechanism (such as float valve) to prevent fuel entry into the sense line. To address this challenge the sense lines are connected to the surge tank. The aircraft fuel tanks are connected to the surge tank via dedicated vent lines. During steady state operating conditions, the fuel tank ullage pressure and surge tank pressure are approximately the same.

The pressure sensors according to various principles of the present disclosure may include integrated optical differential sensors, and the sensor measurement range is 0-6 psig with accuracy of 0.1% FS and an error of 0.2 inches fuel height. The above values of error percentage and pressure are examples only, and other pressures and percentages may be applicable, according to various examples of the disclosure. One end of the differential sensor is connected to the tank wall which senses the fuel pressure, and the other end is connected to tank ullage via the surge tank using the sense line. This arrangement reduces the number of dedicated ullage pressure sensor in the system compared to using sense line at each pressure measurement point on the tank. The lightweight sense line is routed in the fuel tank with connections provided at the tank wall for the pressure sensor interface. The sense line is routed within the fuel tank so that it does not interfere with other components installed along the front or rear spar and eliminates unintended loads during maintenance activities. This arrangement uses purely differential sensors on the tank, thus requiring a smaller full scale range sensor, which provides higher measurement accuracy in the system.

On ground, typically the required A/C fuel system accuracy is 0.5% of tank full scale quantity. This is typically challenging to achieve using absolute pressure sensors. Using differential pressure sensors with an operating range of 0-4 psig (10 ft tank) and 0.2% error FS results in an error of 0.008 psig, or 0.27" fuel height. This sensor accuracy yields a system accuracy of 0.32% error at full on large commercial aircraft tanks. The above values of error percentage and pressure are examples only, and other pressures and percentages may be applicable, according to various examples of the disclosure. This is achievable using commercially available differential sensors. One port of the differential sensor may be connected to the inside of the fuel tank, i.e., the wet side, and the other port is left open to ambient, i.e., outside of the fuel tank. In various principles of the present disclosure, a differential pressure sensor may be located at a bottom portion of the fuel tank, and another differential pressure sensor may be located at a top portion of the fuel tank to measure ullage pressure during refuel. Example principles of the present disclosure include the use of differential pressure sensors with an accuracy of 0.1% full scale (FS). The differential pressure sensors measure the fuel head, and are also connected to the top portion of the fuel tank so as to measure ullage pressure during refueling conditions where it is likely that ullage pressure is more than ambient pressure. In closed vent systems, ullage pressure is expected to be higher than ambient pressure. The fuel level may thus be calculated by subtracting the gas/ullage pressure reading from the fuel pressure reading.

In other principles of the present disclosure, optical pressure sensors allow for improved system accuracy by using, e.g., differential pressure sensors on the ground, and absolute pressure sensors in flight. Absolute pressure sensors measure the absolute pressure of the fuel tank, which is the pressure with respect to vacuum or a known constant pressure. Absolute pressure sensors provide the advantage of a simple sensor arrangement with the sensor head penetrating through the fuel tank wall, and although a separate sensor for ullage may be required, the sensor arrangement remains simple compared to bulkier sense line systems. For example, in order to achieve 0.5% gauging accuracy at full on ground, the sensor error may have to be substantially small and may be challenging to achieve. Using an absolute pressure sensor in the range of 18-20 psia with 0.2% error on full scale (FS) may give a 0.04 psia error, or 1.36" error on fuel height, which may equate to over 1.5% tank measurement error at full on large commercial aircraft tanks. Optical prism point level sensors may be used to detect whether the sensor is submerged in fuel, and therefore may be used for ullage pressure measurements, which may reduce the number of gas/ullage sensors required. Non-contact fuel sensors may be used for ullage measurement, thereby providing additional redundancy. Such sensors may also be used to determine fuel density and provide additional discrete quantity measurement for the fuel tank. The above values of error percentage and pressure are examples only, and other pressures and percentages may be applicable, according to various examples of the disclosure.

In various principles of the present disclosure, the optical prism point level sensor, as discussed above, that is integrated in the optical pressure sensor may provide a known fuel height when transitioning between unsubmerged and submerged. This known fuel height may then be compared against the fuel height calculated using the integrated pressure sensor. Discrepancies in fuel height measurement may be used for fault detection. The optical prism integrated with the differential pressure sensor may also provide discrete level measurements, and may thus add additional point level measurements to the system. In addition, by using a known distance between two pressure sensors in the same tank, the fuel density may also be calculated using this arrangement. This example configuration may also be used for any liquid level measurement applications such as jet fuels, sustainable aviation fuels (SAF), as well as liquid and gaseous hydrogen measurement.

In various principles of the present disclosure, when a sense line is installed inside the fuel tank, condensation of moisture accumulated in the sense line may take place, which may add error in the fuel measurement system. To mitigate this error, a small drain box and a moisture sensor may also be installed at a bottom portion of the tank. The moisture sensor may provide an indication of any moisture accumulated in the system that can be drained using a manual drain valve when the aircraft is on ground. A flight crew advisory may be declared during such events and readings from affected sensors can be ignored for fuel measurement calculation.

In various examples, advantages of the example principles of the present disclosure discussed herein include having a completely, or substantially, outside tank fuel measurement system, which improves build time and cost, and decreases downtime for repairs and maintenance; highly accurate sensor system arrangement that meets or exceeds the required accuracy requirements for aircraft transport fuel tank measurements; reduces the overall sensor weight by about 35% compared to conventional capacitance gauging; is an intrinsically safe system because of the lack of wiring inside of the fuel tank; is substantially immune to electromagnetic interference (EMI); is non-electrical and non-metallic, which eliminates or reduces the risk of lightning strike electrical conduction. Using the integrated optical sensor provides reduction or elimination of the need for having different individual sensors inside of the system; and a simple system arrangement which reduces or eliminates the plumbing that is typically required to connect the differential pressure sensor to tank ullage.

According to various principles of the present disclosure, in flight, the differential pressure sensor port that is open to ambient pressure may experience dynamic pressure and may thus introduce error in the fuel level measurement. In particular, the ambient port of the differential sensor may be subject to dynamic pressures during aircraft climb and descent when flight surfaces are extended, and the port is more exposed to ambient airflow. In this case, absolute pressure sensors measure the fuel quantity with respect to vacuum or a known constant pressure, and thus is not subject to the same error as the differential pressure sensor discussed above. For example, given a pressure sensor range of 0 to 20 psia and allowable measurement error of 0.008 psig requires the absolute pressure sensor to have an accuracy of 0.04% full scale. This accuracy is very difficult to achieve over the full temperature range and aircraft service life. Therefore, to improve the accuracy of the absolute pressure sensor a calibration-based correction factor will be incorporated. The above values of error percentage and pressure are examples only, and other pressures and percentages may be applicable, according to various examples of the disclosure.

In various principles of the present disclosure, a calibration factor may be recorded in lookup tables and applied as correction factors for each pressure sensor in corresponding temperature and pressure ranges in order to maintain pressure sensor accuracy. As an example, the sensor readings may also be cross-checked against nearby sensors on the ground for overall system accuracy and sensor drift check. For example, if a sensor fails the cross-check, the sensor may be determined to be failing, and the measurements provided by the failing sensor may be disregarded. Other sensors in the vicinity of the failed sensor may then be used for the fuel measurement calculation. In addition, a secondary gauging cross-check may be performed on the ground by comparing the fuel measurement calculated separately by the absolute pressure sensors and differential pressure sensors. The calibration data for each sensor may be stored in a sensor memory during production acceptance test, which may provide advantages because the stored calibration data may be used during maintenance and installation of the sensor. This calibration data is read by the fuel gauging computer when the sensor is connected to the system. The calibration or recalibration process may be fully automatic and may not need manual intervention during sensor replacement.

FIG. 1 is a simplified illustration of fuel tanks on an aircraft. For example, FIG. 1 shows aircraft 10 with a plurality of fuel tanks 12. Depending on the type and size of the aircraft, fuel tanks 12 can be located in any of wings 14, fuselage 16, or tail 18. Fuel tanks 12 can have simple or complex geometric shapes. Wings 14 can be formed from a flexible material, such as a composite material. Composite wings 14 are likely to experience more flexing and bending during a flight than traditional metal wings. For example, the position of a wing tip can move nearly two meters (up or down) from a normal position during climbing or descending maneuvers. For aircrafts using liquid hydrogen as fuel, the fuel tanks are located in the fuselage and they are Dewar vessels. Alternatively, according to various examples of the disclosure, the aircraft 10 may include liquid hydrogen tanks 20 within the fuselage 16. Liquid hydrogen tanks may include liquid hydrogen which may be used as fuel by the aircraft 10.

Figure 2A:
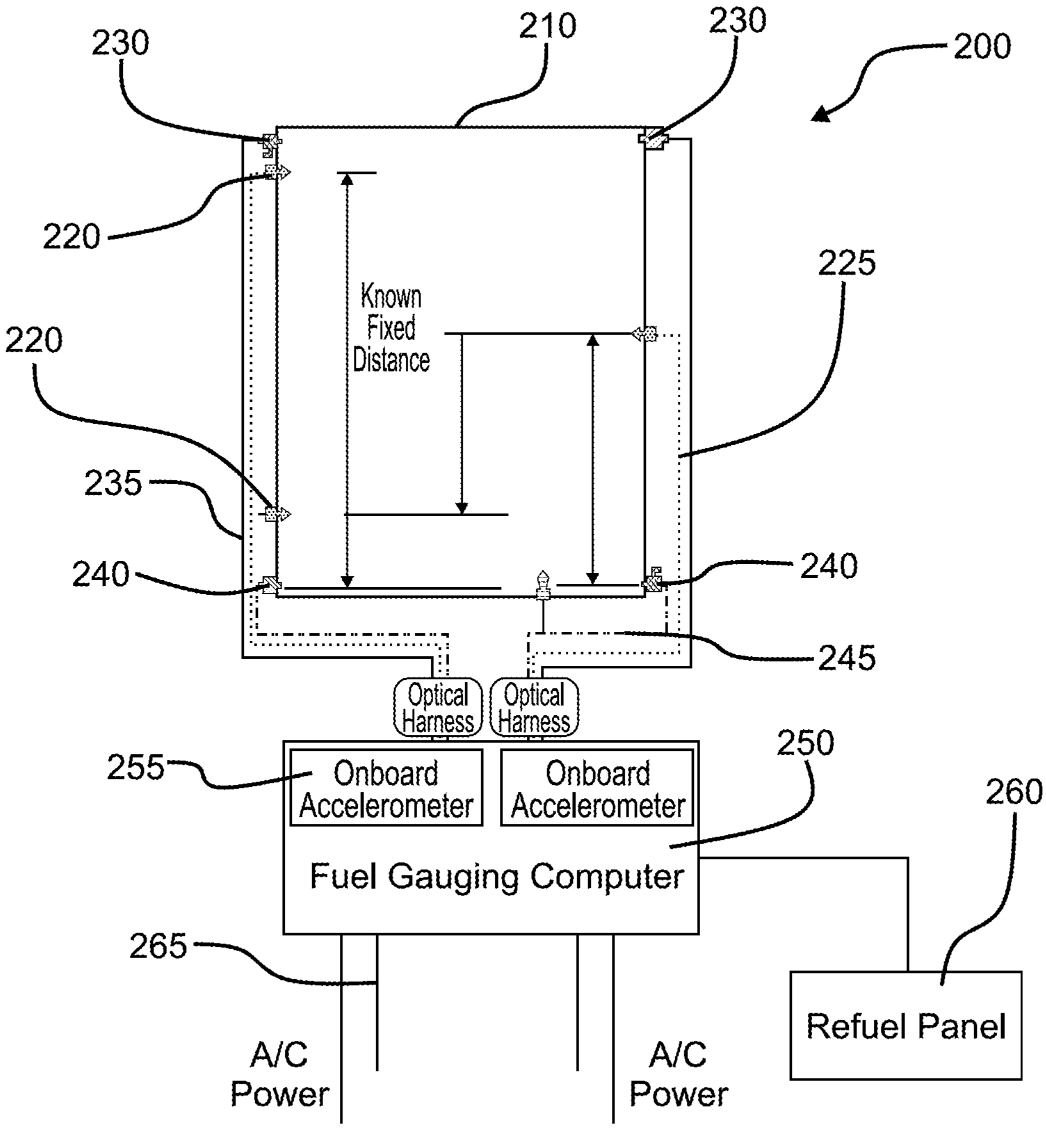
FIGS. 2A-2D are illustrations of fuel tanks equipped with non-contact sensors, according to principles of the present disclosure.

FIGS. 2A-2D are illustrations of fuel tanks equipped with non-contact sensors, according to various principles of the present disclosure. In FIG. 2A, the fuel tank system 200 includes a plurality of non-contact type sensors 220, 230 and 240 installed outside the fuel tank 210 of, e.g., a commercial aircraft. For example, optical prism pressure sensors 220, gas optical pressure sensors 230 and fuel level optical pressure sensors 240 are installed outside of various portions of walls of the tank 210 in a configuration where only the sensing portion of the sensors 220/230/240 is in contact with the fuel inside the fuel tank 210. The various locations of the sensors 220, 230 and 240 may be selected for increased or optimized accuracy of the detection and measurement of fuel remaining inside the fuel tank 210, and may vary based on factors such, e.g., the shape of the fuel tank. Typically, three (3) pressure sensors 230/240 are used to measure the fuel level for each tank 210. For example, the optical prism sensors 220 and the gas optical pressure sensors 230 may be ullage sensors, and the optical pressure sensors 240 may be fuel level sensors. Due to the configuration illustrated in FIG. 2A which utilizes non-contact sensors 220, 230 and 240, the need for any tubing or plumbing lines that are typically located inside the fuel tank 210, is reduced or eliminated. Therefore, problems associated with having any tubing or plumbing lines inside the fuel tank 210 such as, e.g., fuel leakage and condensation, may be reduced or eliminated. In various principles of the present disclosure, the fuel tank system 200 keeps the overall system weight down compared to fuel tank systems using plumbing inside the fuel tank.

In various principles of the present disclosure, the sensors 220, 230 and 240 may be connected to a fuel gauging computer 250 via optical connection lines 225, 235 and 245, respectively, the fuel gauging computer 250 being a computer configured to receive data provided by the sensors 220/230/240, and store or convert that data to measurements of amounts of fuel remaining in the fuel tank 210. For example, the fuel gauging computer 250 may be similar to the computing device 700/800 discussed below with respect to FIG. 7 and FIG. 8. For example, the fuel gauging computer 250 may also control a refuel panel 260.

Figure 2B:
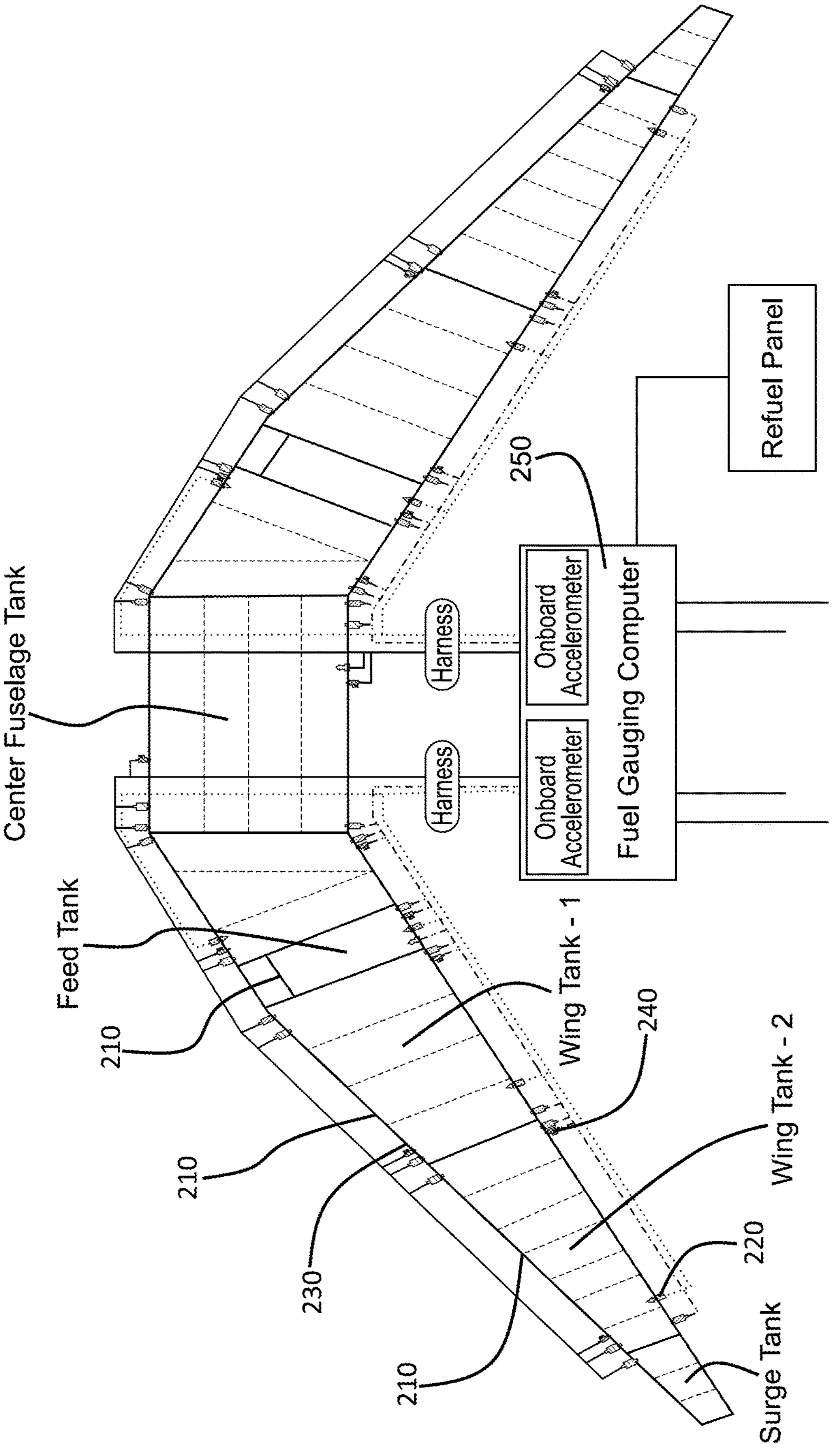

In various principles of the present disclosure, the fuel tank system 200 may rely on the inertial reference system (IRS) data 265 as well as on the onboard accelerometer 255 to take into account the aircraft acceleration when calculating the amount of fuel remaining in the fuel tank 210. When IRS data 265 is not available, the fuel gauging computer 250 may rely on the onboard accelerometer 255 to take into account the aircraft acceleration when calculating the fuel height inside the fuel tank 210. For example, the fuel pitch and roll angles during flight may also be taken into account and calculated using acceleration information obtained from the onboard accelerometer 255. The inferred pitch and roll angles of fuel plane may be calculated using optical pressure sensor readings when a minimum of, e.g., three (3) or more sensors are submerged in the fuel. The architecture illustrated in FIG. 2A may also have a dedicated densitometer to measure the fuel density, and the inferred density may be calculated using fuel temperature that is measured using any one of, e.g., the integrated sensors 220/230/240. As an example, gas pressure sensors 230 and fuel level sensors 240 may also be used during inflight conditions, such as cruise conditions. FIG. 2B is an illustration of fuel tanks 210 in the larger platform of an aircraft, according to various principles of the present disclosure. The various sensors 220, 230 and 240 illustrated in FIG. 2B are similar to FIG. 2A and are not further discussed herein.

Figure 2C:
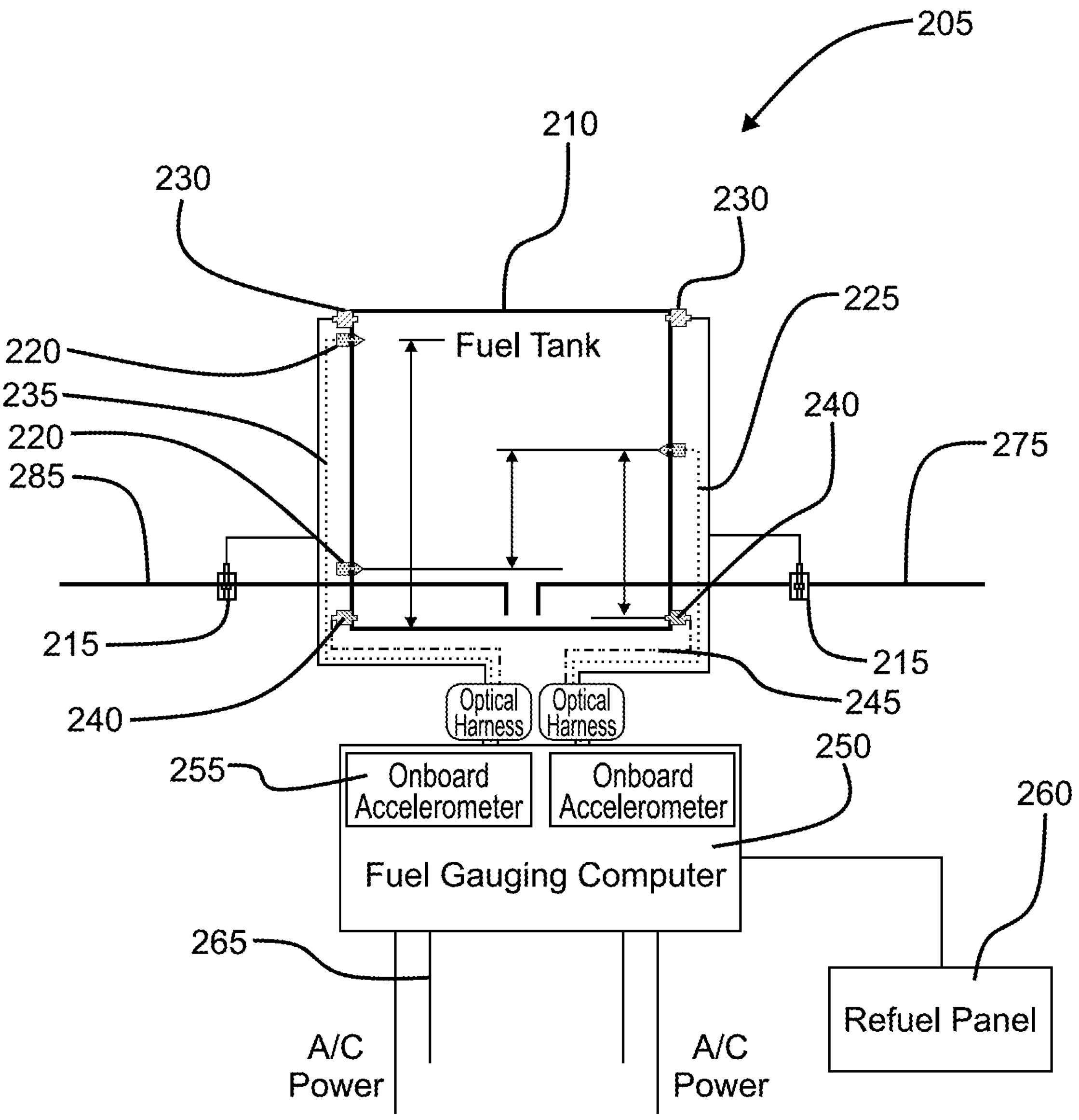

FIG. 2C is an illustration of a fuel tank 205 with optical pressure sensors, in accordance with various principles of the present disclosure. Fuel tank 205 is similar to fuel tank 210 discussed above with respect to FIG. 2A, and the common features of fuel tank 205 with fuel tank 210 will not be further discussed herein. FIG. 2C includes, in addition to the features similar to fuel tank 210, of one or more flowmeters a, one of the flowmeters 215 on an engine feed line 285, and another one of the flowmeters 215 on a transfer line 275. In various principles of the present disclosure, the flowmeters 215 may be added in combination to pressure measurements to determine any remaining fuel quantity inside the fuel tank 210. For example, the gauging computer 250 may record the fuel quantity after completion of a refueling operation of the fuel tank 210, and during flight, the discharged quantity as measured by the flowmeters 215 may be subtracted from the measured remaining fuel in order to obtain a more accurate reading of the onboard fuel quantity. Furthermore, the fuel measurements from the pressure sensors 220, 230 and 240 may also be calculated and corrected based on the readings from the flowmeters 215. In addition, the optical prism of, e.g., the integrated sensor 220, may also provide an additional cross-checking of the remaining fuel quantity information. In an example, any leakage or migrated quantity in a surge tank may also be accounted for using the optical prism sensor 220 as well as optical pressure sensors 230 and 240. Accordingly, using the flowmeters 215 may provide improved accuracy of fuel measurement in the fuel tank system 200, and may allow to remove the strict accuracy requirements of absolute sensors. For example, the flowmeters 215 may also be used in combination with the primary measurement system to improve accuracy of the system and reduce the number of sensors typically used in a fuel tank. The flowmeters 215 may also provide highly accurate sensors for inflight measurement.

Figure 2D:
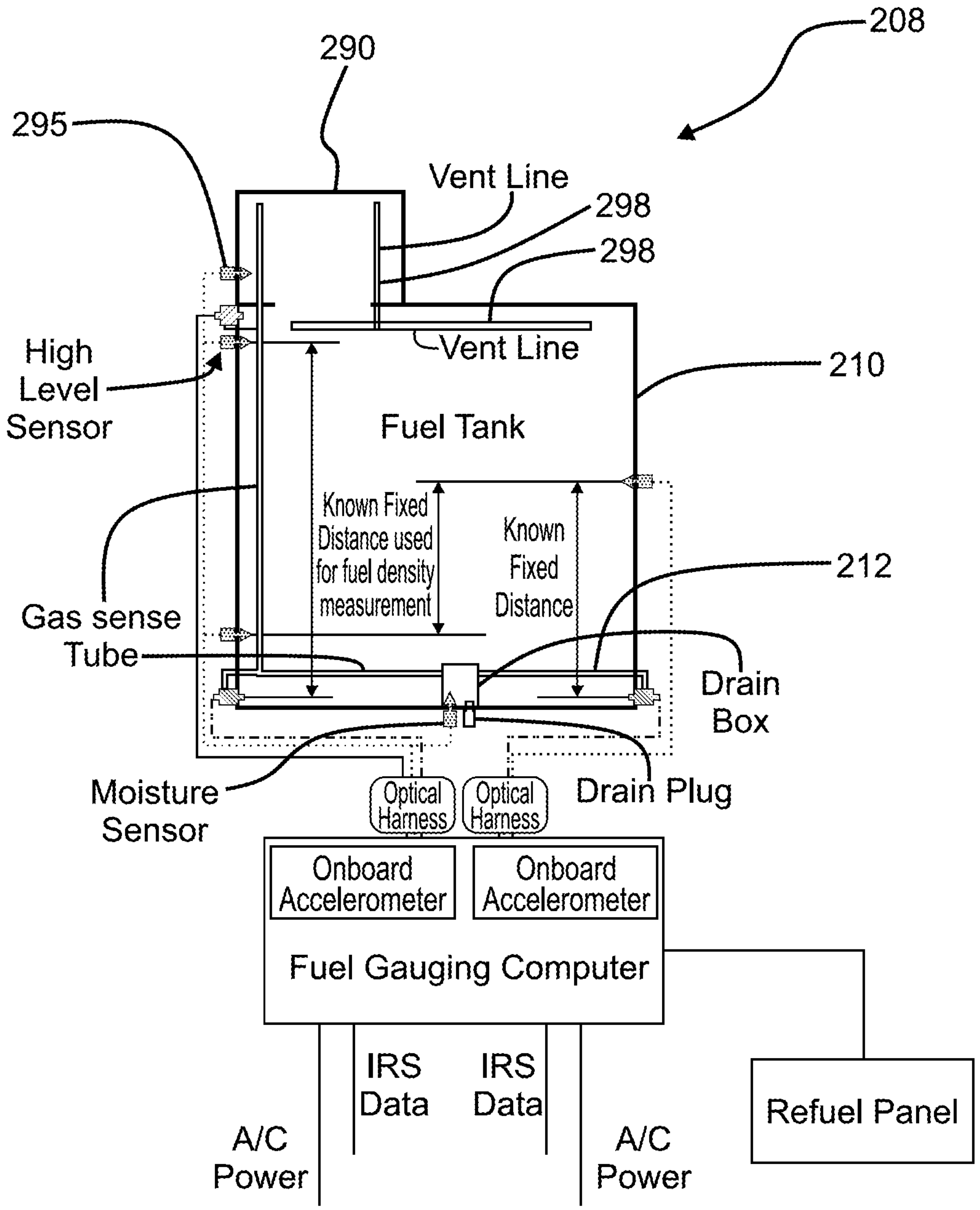

FIG. 2D is an illustration of a fuel tank 208 with optical pressure sensors, in accordance with various principles of the present disclosure. Fuel tank 208 is similar to fuel tank 210 discussed above with respect to FIG. 2A, and the common features of fuel tank 208 with fuel tank 210 will not be further discussed herein. FIG. 2D includes, in addition to the features similar to fuel tank 210, a surge tank 290 configured to act, e.g., as a pressure neutralizer and to absorb any sudden surge of pressure in the fuel tank 208. In an example, the surge tank 290 may include an overflow sensor 295 similar to the integrated optical pressure sensors 220 discussed above with respect to FIG. 2A, and may be connected to the fuel tank 210 via vent lines 298 which are configured to neutralize any pressure surge in the fuel tank 210. This arrangement uses differential sensors on the tank wall, thereby providing improved measurement accuracy. The sense line 212 such as, e.g., a gas sense line, is connected to the surge tank instead of tank ullage to prevent any fuel entering the sense line 212. This arrangement uses a lesser number of differential sensors than using sensors connecting to ullage of the same tank. In addition, using sense lines 212 may allow for removing a need for using absolute pressure sensors.

In various principles of the present disclosure, the non-contact sensors 220, 230 and 240 may be or include integrated optical sensors, and each integrated sensor may include an optical absolute sensor, a gauge or differential sensor, and an optical prism sensor and temperature sensor integrated as a single unit, as further illustrated in FIG. 3A and discussed below. In various principles of the present disclosure, cross-checking the integrated sensor measurements may be performed using optical point level sensors such as sensors having a prism at an end thereof, which may also be used to check the performance of the pressure sensors, as further discussed with respect to FIG. 3A.

Figure 3A:
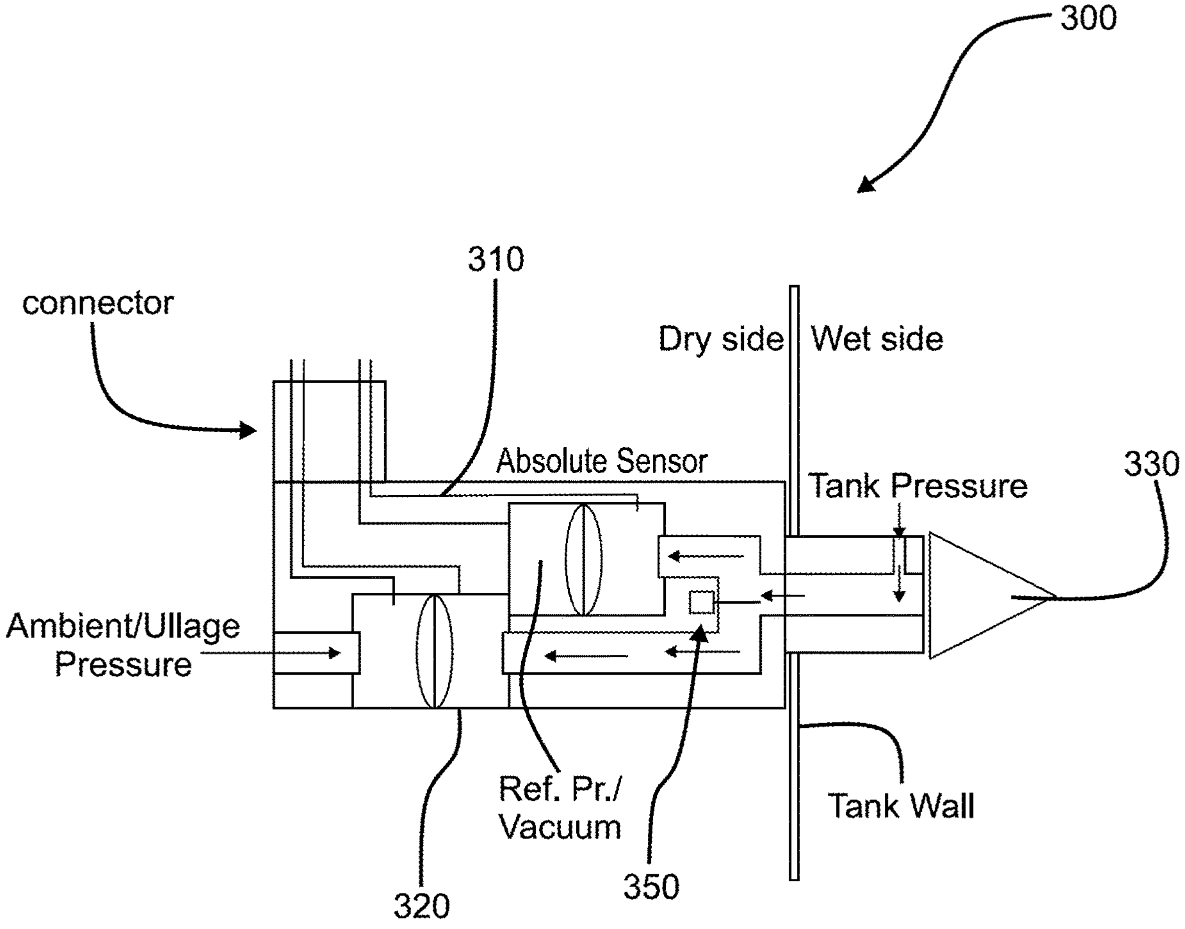
FIGS. 3A-3E illustrate various sensors for fuel measurement, in accordance with various principles of the present disclosure.

FIGS. 3A-3E illustrate various sensors and optical prism sensors for fuel measurement, in accordance with various principles of the present disclosure. FIG. 3A is an integrated optical pressure sensor arrangement. In FIG. 3A, an integrated optical pressure sensor 300 includes optical absolute sensor 310, optical gauge or differential sensor 320, and optical prism sensor 330, temperature sensor 350 all four (4) sensors 310, 320, 330 and 350 being integrated as a single unit to form an integrated pressure sensor 300. By having the various sensors 310, 320, 330 and 350 integrated as a single unit, the integrated sensor 300 can achieve a higher measurement accuracy using a correction-based differential sensor on the ground. For example, the optical prism sensor 330 may be configured to detect the sensor submergence in the fuel and may be used to measure, e.g., ullage pressure. By using the integrated pressure sensor 300, the number of gas/ullage sensors and pressure sensors typically required for a fuel tank may be decreased by, e.g., up to a factor of 1.5 or 2. Using integrated pressure sensor 300 may also provide redundancy in the pressure and fuel level measurements, and may also allow measuring the density of the fuel present in the fuel tank. In addition, the optical prism sensor 330 may sense whether the prism is submerged in the fuel or not, and this evaluation may provide additional discrete measurements indicative of the status of the remaining fuel in the fuel tank. In various principles of the present disclosure, useful measurements may also be provided by non-integrated pressure sensors, as further discussed with respect to FIGS. 3B-3C discussed below.

Figure 3B:
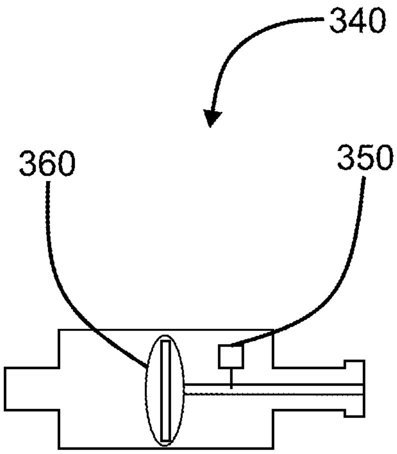
Figure 3C:
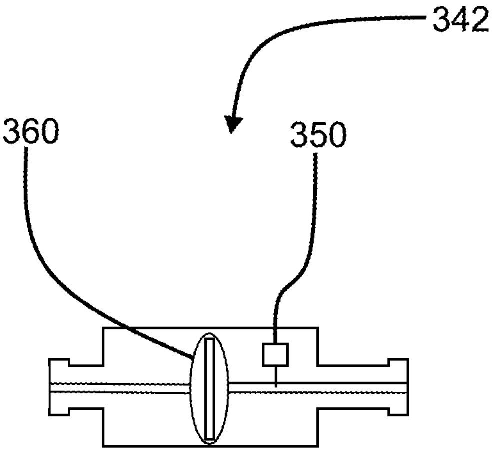
Figure 3D:
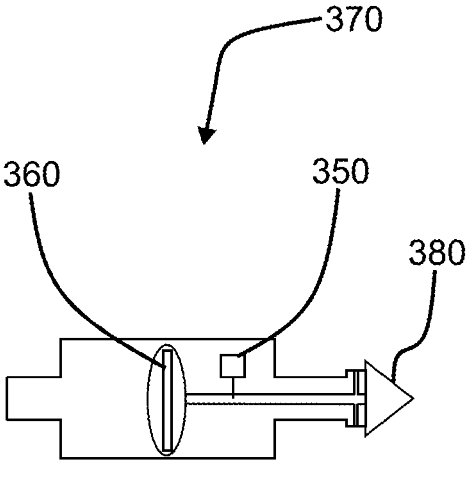
Figure 3E:
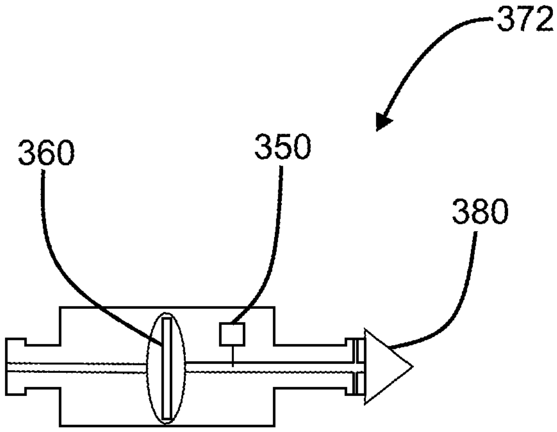

FIG. 3B-3E illustrate non-integrated sensors, according to various principles of the present disclosure. FIG. 3B illustrates an absolute optical pressure sensor 340. In various principles of the present disclosure, the optical pressure sensor 340 may include a temperature sensor 350 and a diaphragm and cavity (e.g., Fabry-Pérot cavity) 360. FIG. 3C illustrates a differential optical pressure sensor 342. In various principles of the present disclosure, the optical pressure sensor 340 may include a temperature sensor 350 and a diaphragm and cavity (e.g., Fabry-Pérot cavity) 360. FIG. 3D is an optical pressure sensor arrangement for absolute sensors with an optical prism sensor. FIG. 3C illustrates an absolute pressure sensor 370 having an optical prism 380 and that further includes the temperature sensor 350 and the diaphragm and cavity (e.g., Fabry-Pérot cavity) 360. FIG. 3D illustrates a differential pressure sensor 372 having an optical prism 380 as well as a temperature sensor 350 and a diaphragm and cavity (e.g., Fabry-Pérot cavity) 360.

Figure 4A:
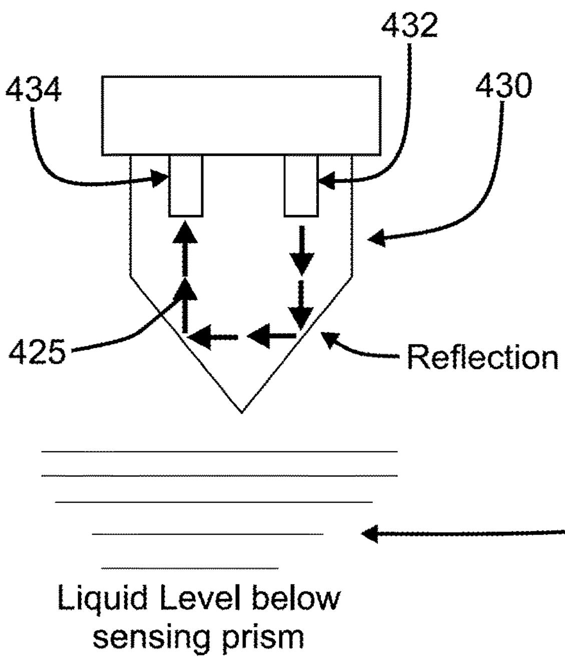
FIGS. 4A-4B illustrates operation of the optical liquid-level sensors 380, according to various principles of the present disclosure.
Figure 4B:
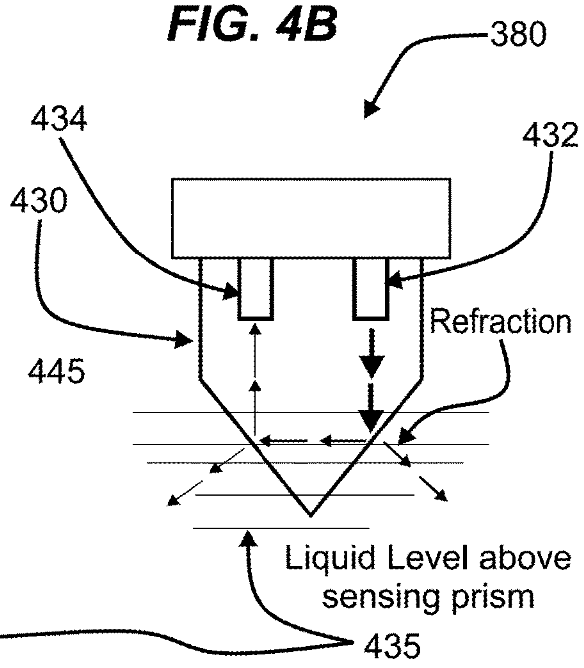

According to various examples of the disclosure, in operation of both the absolute pressure sensor 370 and the differential pressure sensor 372, the optical prism 380, being located inside the fuel tank wall while the temperature sensor 350 and diaphragm and cavity (e.g., Fabry-Pérot cavity) 360 remain outside the fuel tank wall, may detect whether the prism 380 is submerged when a light path traveling inside the prism is disturbed by the fuel submerging the prism 380, as further discussed with respect to FIGS. 4A-4B below. In various principles of the present disclosure, non-integrated pressure sensors such as sensors 340, 342, 370 and 372 may also be accurate, e.g., accurate up to 0.03% of full scale (FS) if the sensors 340/370 are chosen in the range of 0-20 psia over the range of pressure and temperature change for absolute measurement and 0-6 psig over the range of pressure and temperature change for differential measurement. These accuracy levels and pressures are provided as examples, and other accuracy levels and pressures may be applicable according to various examples of the disclosure.

FIGS. 4A-4B illustrates operation of optical liquid-level sensors, according to various principles of the present disclosure. In various principles of the present disclosure, the optical prism sensor 430 is configured to reflect the optical signal 425. When the optical prism 430 is above the level of the fuel 435, as illustrated in FIG. 4A, then the optical path of the optical signal 425 remains undisturbed, and the light emitted by the light source 432 such as, e.g., an LED/laser, is detected at the receiver 434 because substantially all of the light signal emitted by the light source 432 is reflected within the prism sensor 430. When the optical prism 430 is submerged partially or totally in the fuel 435, as illustrated in FIG. 4B, the optical path of the optical signal 425 is disturbed, and a disturbed optical path 445 is detected because the light emitted by the light source 432 such as, e.g., a LED/laser, is either not detected by the receiver 434, or detected at a lower intensity, because part of the light signal emitted by the light source 432 is refracted outside of the prism sensor 430. The disturbance of the optical path 445, which may be measured, e.g., by a loss of intensity of the light signal emitted by the light source 432, may be indicative of the amount of fuel remaining in the fuel tank. For example, the amount of disturbance of the disturbed optical path 445 may be indicative of a level of the fuel 435 inside the fuel tank. In addition, as only an optical signal travels through the portion of the optical prism 430 that is in contact with the fuel, no electric signals travel through that portion of the optical prism 430, and as such certain safety features may no longer be required, thus simplifying the design and the certification effort.

FIGS. 5A-5B are schematic diagrams illustrating an optical pressure sensor, in both an installed configuration and a removed configuration, in accordance with the principles of the present disclosure. In FIG. 5A, the sensor 510 is installed at the tank wall 520 using a sensor fitting 530 that has self-sealing capability. In particular, the sensor fitting 530 includes a check valve 540 such as, e.g., a poppet valve, that is configured to prevent damage to the optical prism and by preventing or reducing leakage during the replacement of the sensor 510. The valve 540 may include a compression spring 550 and a plunger 560 configured to urge the valve 540 either against the tank wall 520 or away from the tank wall 520. The fitting 530 includes holes 570 on a side thereof, the holes 570 constituting a liquid flow path between the liquid in the fuel tank and the inside of the fitting 530. The flow paths are designed such a that no air is trapped in the fitting and sensor.

In operation in an installed configuration as illustrated in FIG. 5A, the valve 540 is pulled away from the tank wall 520 by the plunger 560 past the holes 570 so that fuel from the fuel tank can enter the inside of the fitting 530. As such, the optical prism 580 may be in contact with, or submerged in, the fuel. If the sensor 510 is removed while in this configuration, fuel from the fuel tank may leak outside of the fuel tank.

In operation in a removed configuration as illustrated in FIG. 5B, when the valve 540 is pulled away from the tank wall 520 past the liquid flow path 570, then the optical prism 580 may come in contact with any fuel present in the fuel tank. In operation in a removed configuration, when the valve 540 is pushed towards the tank wall 520 and past the holes 570 by action of the plunger 560, then the valve 540 separates the optical prism 580 from the fuel in the fuel tank because the liquid flow path 570 is now cut off from the optical prism 580. As a result, the sensor 510 may be removed for, e.g., maintenance, replacement, or the like, without leakage of the fuel out of the tank and without having to empty the fuel tank, open the fuel tank, or otherwise interrupt operation of the fuel tank. This configuration provides the ability to replace the sensor as needed and without having to defuel the fuel tank, thereby reducing aircraft downtime during maintenance activities. This configuration may be applicable to, e.g., jet fuels, sustainable aviation fuels (SAF), liquid or gaseous hydrogen measurements, and the like.

Figure 6:
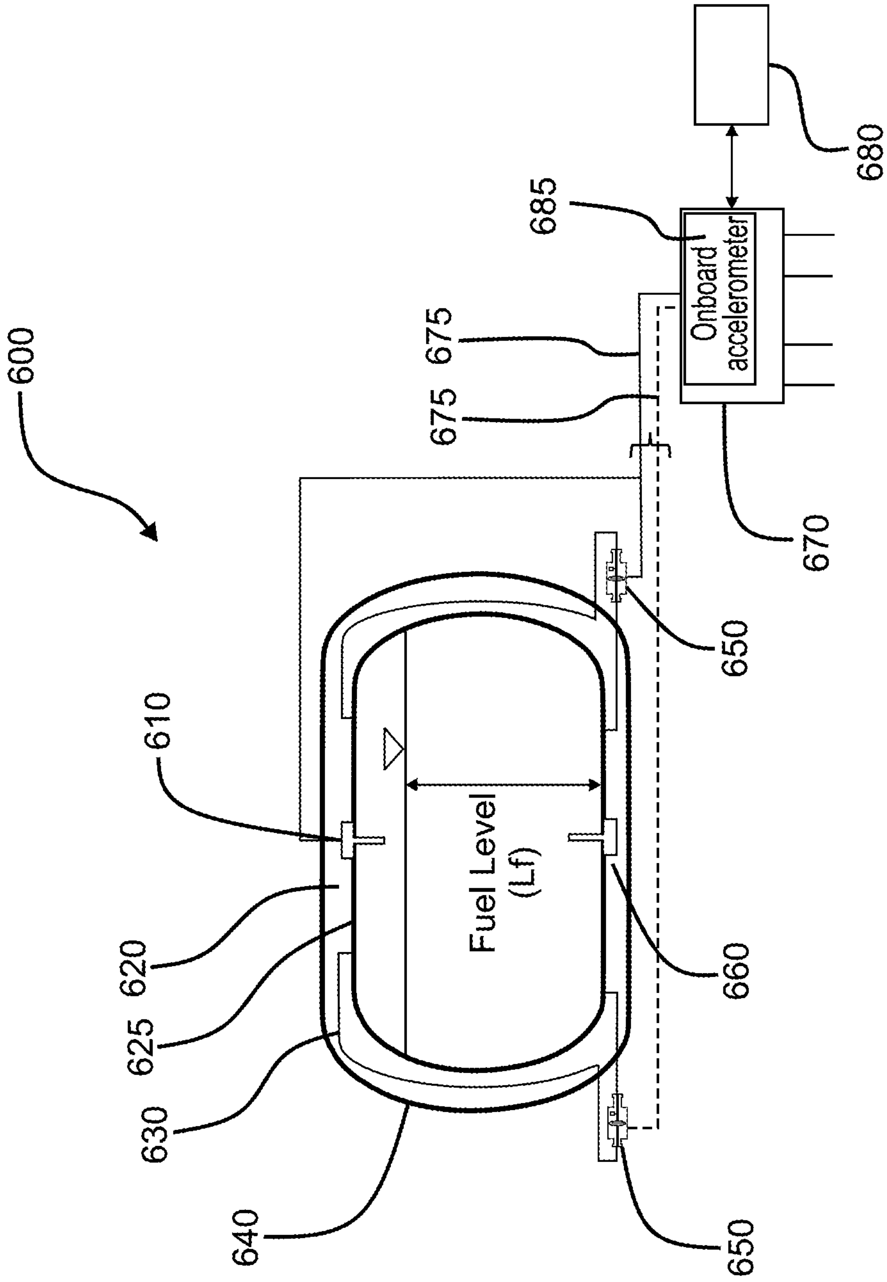
FIG. 6 is a liquid hydrogen measurement system using optical pressure sensors, in accordance with various principles of the present disclosure.

FIG. 6 is a liquid hydrogen measurement system using optical pressure sensors, in accordance with various principles of the present disclosure. In FIG. 6, the liquid hydrogen measurement system 600 includes a liquid hydrogen tank 640 inside which a vacuum space 620 and an inner liquid hydrogen tank 625 are arranged. In various principles of the present disclosure, one or more capillary tubes 630 may be provided within the vacuum space 620 to connect the inner liquid hydrogen tank 625 with one or more sensor 650 such as, e.g., optical differential pressure sensors 650. For example, the optical differential pressure sensors 650 may be similar to any of the non-contact sensors 220, 230 and 240 discussed above with respect to FIG. 2A, and will not be further discussed herein. The liquid hydrogen measurement system 600 may also include a vapor temperature and density sensor 610 configured to measure a vapor temperature and density of the vapor inside the liquid hydrogen tank 625, and a liquid temperature and density sensor 660 configured to measure a liquid temperature and density of the liquid inside the liquid hydrogen tank 625. For example, the liquid hydrogen measurement system 600 may also include a fuel gauging computer 670 connected to the sensors 650 via one or more optical lines 675, and a refuel panel 680 connected to the fuel gauging computer 670. For example, the fuel gauging computer 670 and the refuel panel 680 may be similar to the fuel gauging computer 250 and refuel panel 260 discussed above with respect to FIG. 2A, and will not be further discussed herein.

In various principles of the present disclosure, FIG. 6 illustrates a Dewar vessel as the liquid hydrogen measurement system 600 which contains liquid hydrogen. The differential optical pressure sensors 650 are connected to the vessel 600 using capillary tubes 630. The optical pressure sensors 650 may be connected to fuel gauging computer 670 using optical fiber cables 675. Densitometer sensors, also referred to as vapor/liquid temperature and density sensors 610 and 660, may include built-in temperature sensors, are configured to measure the density of either the liquid or the vapor inside the liquid hydrogen tank 625. According to various principles of the present disclosure, this method may not use electricity, and may thus be immune to electromagnetic interference (EMI). In addition, the gauging computer 670 may use an onboard accelerometer 685 which may account for any acceleration effect in determining the liquid levels inside the vessel 600 when aircraft IRS data is not available. Accordingly, similarly to the configurations relative to fuel tanks 200, 205 and 400 discussed above, it is possible to use non-contact integrated optical sensors 650 to obtain an accurate reading of the quantity, volume and/or level of remaining fluid inside a tank such as tank 625. As for aircraft fuel tanks, liquid level measurements inside the tank 625 may be performed with increased safety, decreased costs due to lack of wiring installation inside the tank, and decreased down time for repairs, maintenance, and the like.

Measurement of the liquid hydrogen level Δp may be performed based on the formula expressed in Equations (1) and (2) below:

$$\Delta p = \rho_f L_f g \tag{1}$$

$$L_f = \frac{\Delta p}{\rho_f g} \tag{2}$$

In Equations (1) and (2), $L_f$ is the height of the liquid column, $\rho_f$ is the liquid density, and g is the local gravity. Although the above refers to the calculation of the liquid hydrogen level in a liquid hydrogen tank, the level of fuel in a fuel tank may be similarly calculated.

Figure 7:
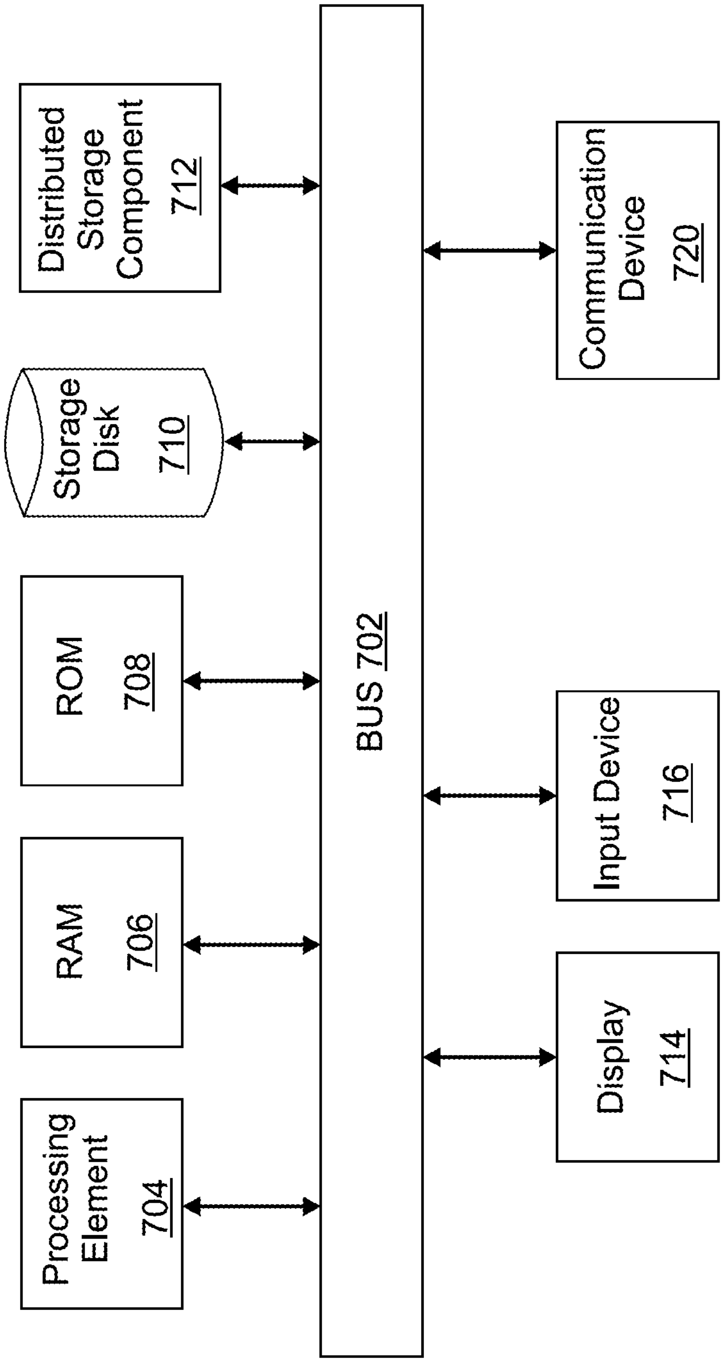
FIG. 7 depicts a block diagram of a computing device.

FIG. 7 depicts a block diagram of a computing device, according to various principles of the present disclosure. In the illustrated example, the computing device 700 may include a bus 702 or other communication mechanism of similar function for communicating information, and at least one processing element 704 (collectively referred to as processing element 704) coupled with bus 702 for processing information. As will be appreciated by those skilled in the art, the processing element 704 may include a plurality of processing elements or cores, which may be packaged as a single processor or in a distributed arrangement. Furthermore, a plurality of virtual processing elements 704 may be included in the computing device 700 to provide the control or management operations for the fuel tank systems 200, 205 and 400 illustrated above.

The computing device 700 may also include one or more volatile memory(ies) 706, which can for example include random access memory(ies) (RAM) or other dynamic memory component(s), coupled to one or more busses 702 for use by the at least one processing element 704. Computing device 700 may further include static, non-volatile memory(ies) 708, such as read only memory (ROM) or other static memory components, coupled to busses 702 for storing information and instructions for use by the at least one processing element 704. A storage component 710, such as a storage disk or storage memory, may be provided for storing information and instructions for use by the at least one processing element 704. As will be appreciated, the computing device 700 may include a distributed storage component 712, such as a networked disk or other storage resource available to the computing device 700.

The computing device 700 may be coupled to one or more displays 714 for displaying information to a user. The computing device 700 may further include an input/output (I/O) component, such as a serial connection, digital connection, network connection, or other input/output component for allowing intercommunication with other computing components and the various components of the fuel tank systems 200, 205 and 400 illustrated above.

In various embodiments, computing device 700 can be connected to one or more other computer systems via a network to form a networked system. Such networks can for example include one or more private networks or public networks, such as the Internet. In the networked system, one or more computer systems can store and serve the data to other computer systems. The one or more computer systems that store and serve the data can be referred to as servers or the cloud in a cloud computing scenario. The one or more computer systems can include one or more web servers, for example. The other computer systems that send and receive data to and from the servers or the cloud can be referred to as client or cloud devices, for example. Various operations of the fuel tank systems 200, 205 and 400 illustrated above may be supported by operation of the distributed computing systems.

The computing device 700 may be operative to control operation of the components of the fuel tank systems 200, 205 and 400 illustrated above through a communication device such as, e.g., communication device 720, and to handle data provided from the data sources as discussed above with respect to the fuel tank systems 200, 205 and 400. In some examples, analysis results are provided by the computing device 700 in response to the at least one processing element 704 executing instructions contained in memory 706 or 708 and performing operations on the received data items. Execution of instructions contained in memory 706 and/or 708 by the at least one processing element 704 can render the fuel tank systems 200, 205 and 400 operative to perform methods described herein.

The term "computer-readable medium" as used herein refers to any media that participates in providing instructions to the processing element 704 for execution. Such a medium may take many forms, including but not limited to, non-volatile media, volatile media, and transmission media. Non-volatile media includes, for example, optical or magnetic disks, such as disk storage 710. Volatile media includes dynamic memory, such as memory 706. Transmission media includes coaxial cables, copper wire, and fiber optics, including the wires that include bus 702.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to the processing element 704 for execution. For example, the instructions may initially be carried on the magnetic disk of a remote computer. The remote computer can load the instructions into its dynamic memory and send the instructions over a telephone line using a modem. A modem local to computing device 700 can receive the data on the telephone line and use an infra-red transmitter to convert the data to an infra-red signal. An infra-red detector coupled to bus 702 can receive the data carried in the infra-red signal and place the data on bus 702. Bus 702 carries the data to memory 706, from which the processing element 704 retrieves and executes the instructions. The instructions received by memory 706 and/or memory 708 may optionally be stored on storage device 710 either before or after execution by the processing element 704.

Figure 8:
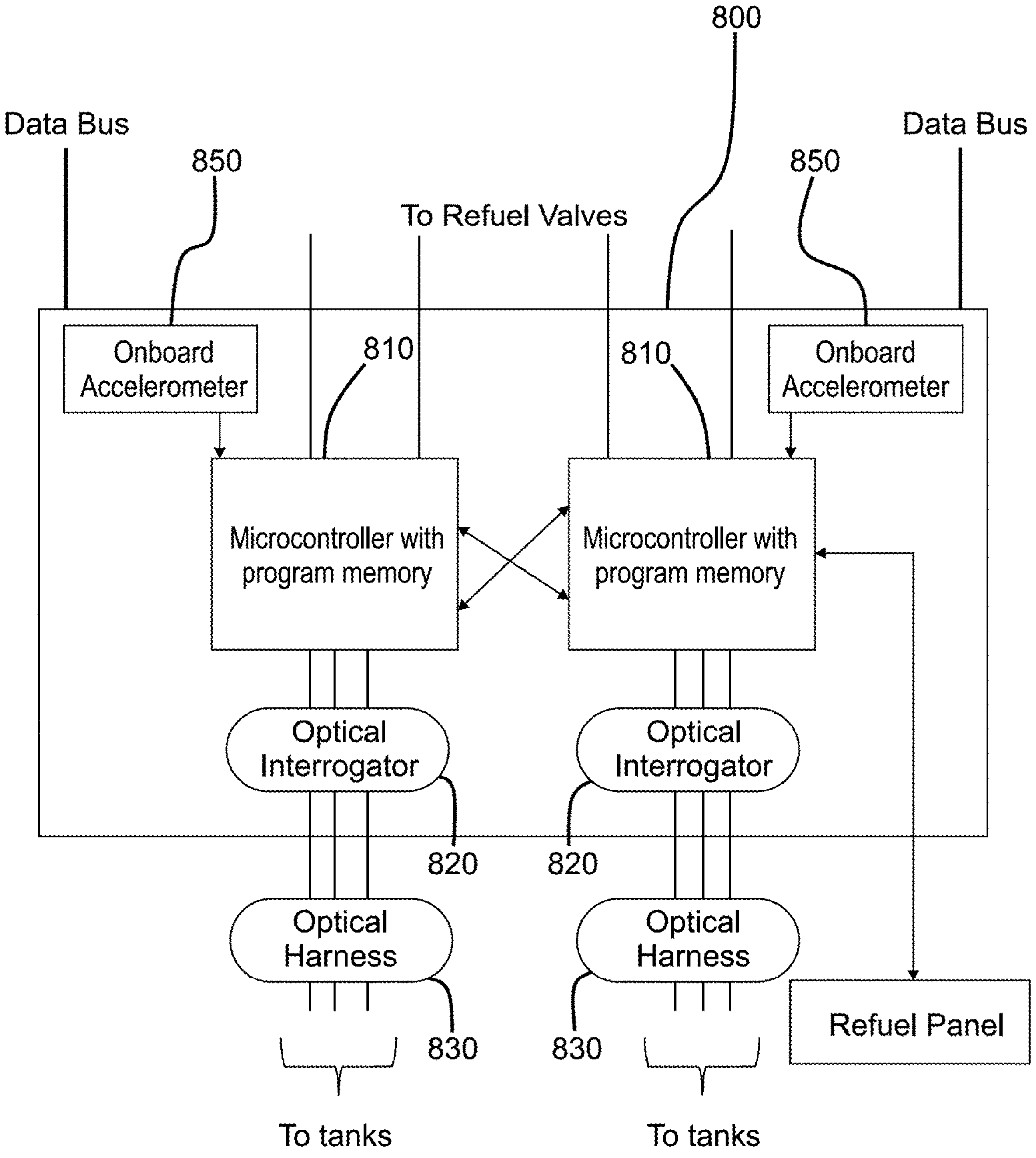
FIG. 8 depicts a block diagram of a control arrangement, according to various examples of the disclosure.

FIG. 8 depicts a block diagram of a control arrangement, according to various examples of the disclosure. In FIG. 8, the control arrangement 800 comprises one or more controllers 810 such as, e.g., microcontrollers that have a program memory. In various examples, the controllers 810 may be coupled to optical interrogators 820 such as, e.g., optical receptors, which receive an optical signal from optical sensors such as, e.g., the optical sensors 300, 340, 342, 370 and 372 discussed above. For example, the optical interrogators 820 may receive the optical signals via optical harnesses 830 which are coupled to the optical sensors. In various examples, the control arrangement 800 may also include onboard accelerometers 850. For example, the data provided by the onboard accelerometers 850, together with or alternatively to IRS may allow to take into account the aircraft acceleration when calculating, e.g., the amount of fuel remaining in the fuel tank.

Figure 9:
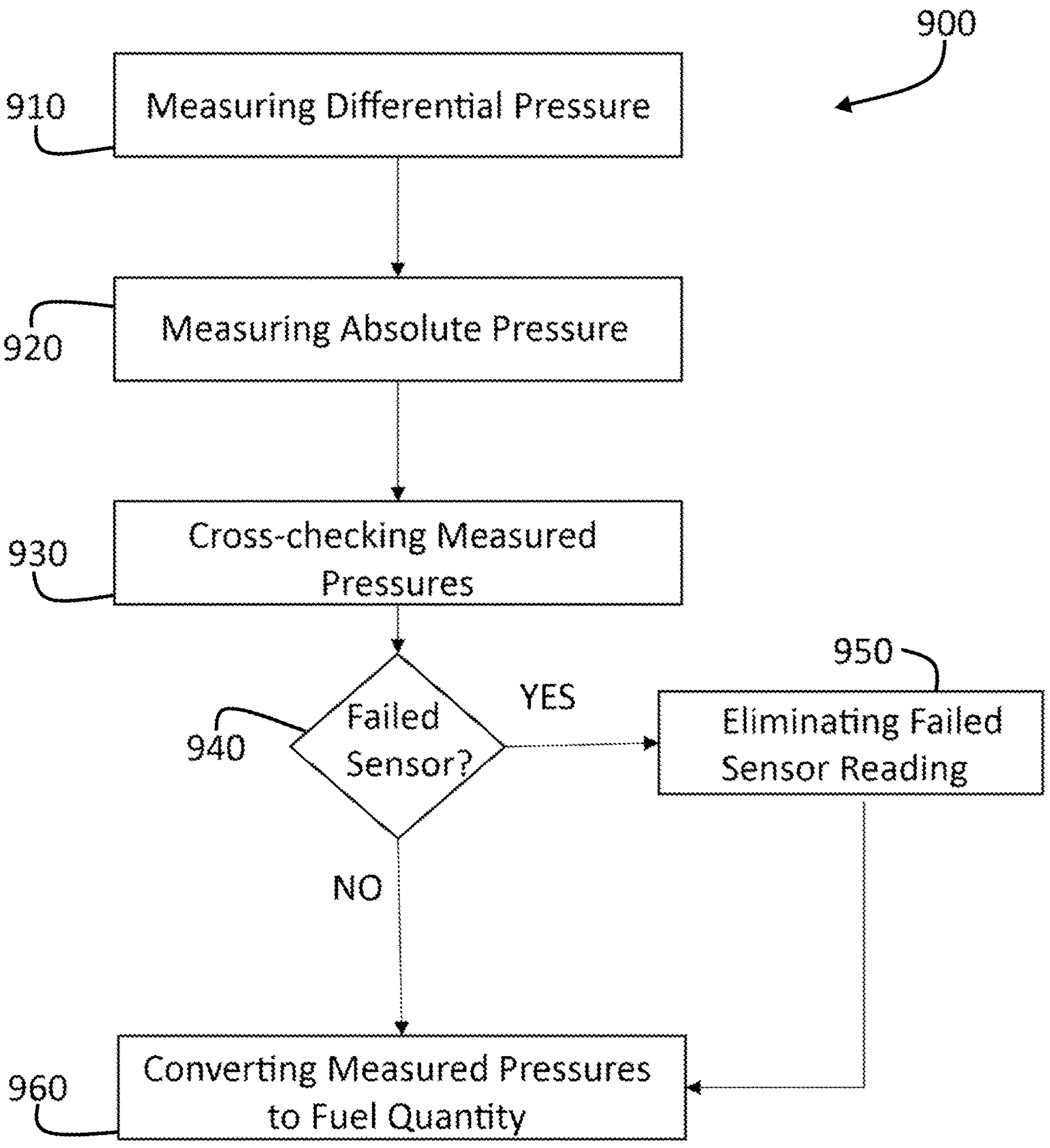
FIG. 9 is a flowchart describing a method of determining a quantity of fuel remaining in a fuel tank, in accordance with various principles of the present disclosure.

FIG. 9 is a flowchart describing a method of determining a quantity of fuel remaining in a fuel tank, in accordance with various principles of the present disclosure. For the sole purpose of convenience, method 900 is described through use of at least the example system 700 described in combination with the systems discussed above. However, it is appreciated that the method 900 may be performed by any suitable system. In FIG. 9, the method 900 includes operation 910, where a differential pressure is measured via, e.g., one or more optical integrated differential sensors, of the pressure inside a fuel tank. With reference to FIG. 2A, the optical integrated differential sensors may be similar to sensors 220, 230 and 240, and the fuel tank may be similar to fuel tank 210. During operation 920, absolute pressure measurements may be taken via, e.g., optical absolute pressure sensors. Although operation 920 is discussed as following operation 910, in various principles of the present disclosure, operation 920 may take place before operation 910, or alternatively, both operations 910 and 920 may be contemporaneous. During operation 930, the measured pressures are cross-checked against each other. For example, the measurements of a differential pressure sensor on ground taken by a differential pressure sensor in a portion of the fuel tank may be compared to the measurement of an absolute pressure sensor in flight taken by an absolute pressure sensor in the vicinity of the differential pressure sensor. If both measurements are within a desirable range, then during operation 930 the measurements are deemed to be satisfactorily cross-checked. During operation 940, the pressure sensors, both absolute and differential, are checked to determine whether they are failing. For example, a failed pressure sensor may be a sensor that measured a pressure that is substantially different from other pressures in the vicinity thereof. If the difference between the sensor and other sensors in the vicinity is too large, i.e., above a desired threshold, then the sensor may be deemed to be failing. As a result, during operation 950, the reading measurement of the failed sensor is eliminated. If during operation 940, the sensor is deemed to be operational, then during operation 960, the sensor reading is taken into account in determining the fuel quantity remaining inside the fuel tank. During operation 960, the pressure readings of all pressure sensors are taken into account to determine the fuel quantity remaining inside the fuel tank.

In accordance with various embodiments, instructions operative to be executed by a processing element to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

This disclosure described some examples of the present technology with reference to the accompanying drawings, in which only some of the possible examples were shown. Other aspects can, however, be embodied in many different forms and should not be construed as limited to the examples set forth herein. Rather, these examples were provided so that this disclosure was thorough and complete and fully conveyed the scope of the possible examples to those skilled in the art.

Various modifications and alterations of this disclosure will become apparent to those skilled in the art without departing from the scope and spirit of this disclosure, and it should be understood that the inventive scope of this disclosure is not to be unduly limited to the illustrative examples set forth herein.

What is claimed is:

1. A measurement system of liquid quantity in a receptacle, the measurement system comprising:

a plurality of integrated sensor units at various locations of the receptacle, the receptacle including the liquid therein, each of the plurality of integrated sensor units being at least partly on an outside surface of the receptacle and including a plurality of sensors, at least one of the plurality of integrated sensor units including an optical prism sensor for determining the presence or absence of the liquid at a predetermined height within the receptacle, a temperature sensor, an optical differential pressure sensor, and an optical absolute pressure sensor, the optical absolute sensor and the optical differential pressure sensor being located outside of an interior of the receptacle and placed in fluid communication with the interior of the receptable by a fluid path defined by the integrated sensor unit when the at least one integrated sensor unit is mounted to a wall of the receptacle, the fluid path extending outside the interior of the receptacle when the at least one integrated sensor unit is mounted to the wall of the receptacle to fluidly connect the optical absolute sensor and the optical differential pressure sensor to the interior of the receptacle, the temperature sensor being positioned along the fluid path;

a data receiver coupled to the plurality of sensor units via one or more connectors and configured to receive measurements from the plurality of sensor units via the one or more connectors; and a processor coupled to the data receiver and configured to convert the received measurements from the plurality of sensor units to a measured quantity of liquid inside the receptacle.

2. The system of claim 1, wherein the liquid comprises aircraft fuel, and the receptacle comprises one of a fuel tank and a liquid hydrogen tank.

3. The system of one of claim 1, wherein the plurality of integrated sensor units comprise one of electrical sensor units, electro-optical sensor units, and optical sensor units.

4. The system of claim 1, wherein the liquid comprises liquid hydrogen, and the receptacle is a liquid hydrogen storage tank.

5. The system of claim 1, wherein the plurality of integrated sensor units are configured to measure, at a physical location thereof, a pressure inside the receptacle.

6. The system of claim 1, further comprising one or more flowmeters, each flowmeter being configured to measure an amount of liquid transferred in and out of the receptacle.

7. The system of claim 6, wherein:

at least one of the flowmeters is coupled to a feed line to measure the amount of liquid transferred into the receptacle; and at least another one of the flowmeters is coupled to a transfer line to measure the amount of liquid transferred out of the receptacle.

8. The system of claim 1, further comprising one or more gas sense lines inside the receptacle, the gas sense lines being connected to one or more differential pressure sensors.

9. The system of claim 1, further comprising:

a plurality of sensor fittings inside the receptacle in correspondence to each one of the plurality of integrated sensor units;

each sensor fitting including a valve configured to isolate the corresponding integrated sensor unit from the liquid inside the receptacle.

10. The system of claim 9, wherein each sensor fitting comprises an urging member and a plunger configured to urge the valve towards a wall of the receptacle so as to prevent the liquid from contacting the corresponding integrated sensor unit.

11. The system of claim 1, wherein:

each integrated sensor unit comprises a sensor memory; and calibration data for each integrated sensor unit may be stored in the sensor memory.

12. The measurement system of claim 1, wherein the at least one integrated sensor unit is configured as a single wall-mountable component including a sensor unit body that supports the optical prism sensor inside the interior of the receptacle; that supports the pressure sensors outside the interior of the receptacle; and that defines the fluid path extending outside the interior of the receptacle.

13. The measurement system of claim 1, wherein the predetermined height corresponding to the at least one integrated sensor unit is positioned such that readings from the optical prism sensor of the at least one integrated sensor unit indicate whether the corresponding pressure sensor is sensing pressure at a location above or below a liquid level within the receptacle.

14. An integrated sensor unit for sensing pressure inside a receptacle, the integrated sensor unit comprising:

an optical differential pressure sensor;

an optical absolute pressure sensor;

an optical prism sensor for determining the presence or absence of the liquid at a predetermined height within the receptacle; and a temperature sensor;

the integrated sensor unit being configured such that the optical absolute sensor and the optical differential pressure sensor are outside an interior of the receptacle when the integrated sensor unit is mounted to a wall of the receptacle, the integrated sensor unit defining a fluid path that is configured to extend outside the interior of the receptacle when the integrated sensor unit is mounted to the wall of the receptacle to fluidly connect the optical absolute sensor and the optical differential pressure sensor to the interior of the receptacle, the temperature sensor being positioned along the fluid path, and the integrated sensor unit being configured such that when the integrated sensor unit is mounted to the wall of the receptacle the predetermined height is positioned such that readings from the optical prism sensor indicate whether the optical differential pressure sensor and the optical absolute pressure sensor are sensing pressure at a location above or below a liquid level within the receptacle.

15. A method of liquid measurement inside of a receptacle, the method comprising:

measuring a plurality of pressure measurements at a plurality of locations of the receptacle via a plurality of integrated sensor units, at least one integrated sensor unit comprising a plurality of sensors, at least one of the plurality of sensors including an optical prism sensor for determining the presence or absence of the liquid at a predetermined height within the receptacle, a temperature sensor, an optical differential pressure sensor, and an optical absolute pressure sensor, the optical absolute sensor and the optical differential pressure sensor being located outside an interior of the receptacle and placed in fluid communication with the interior of the receptacle by a fluid path defined by the at least one integrated sensor unit when the integrated sensor unit is mounted to a wall of the receptacle, the fluid path extending outside the interior of the receptacle when the at least one integrated sensor unit is mounted to the wall of the receptacle to fluidly connect the optical absolute sensor and the optical differential pressure sensor to the interior of the receptacle, the temperature sensor being positioned along the fluid path;

cross-checking the plurality of pressure measurements;

receiving a pressure measurement of each of the cross-checked plurality of pressure measurements; and converting the received pressure measurements into a quantity of liquid remaining in the receptacle.

16. The method of claim 15, wherein cross-checking the plurality of pressure measurements comprises:

comparing a pressure measurement at one location with pressure measurements at other locations in a vicinity of the one location; and based on the comparison, determining whether a pressure measurement at the one location is an accurate pressure measurement.

17. The method of claim 16, wherein converting the received pressure measurement comprises converting the received pressure measurement when the received pressure measurement is accurate.

18. The method of claim 16, wherein determining whether the pressure measurement at the one location is an accurate pressure measurement comprises determining that a difference between the pressure measurement at the one location and the pressure measurements at other locations in the vicinity of the one location is below a desired threshold.

19. The method of claim 15, wherein cross-checking the plurality of pressure measurements comprises comparing pressure measurements between absolute pressure sensors and differential pressure sensor.

* * * * *